(No Model.)   2 Sheets—Sheet 1.
E. C. BOYER.
DISK HARROW AND CULTIVATOR.
No. 401,994.   Patented Apr. 23, 1889.
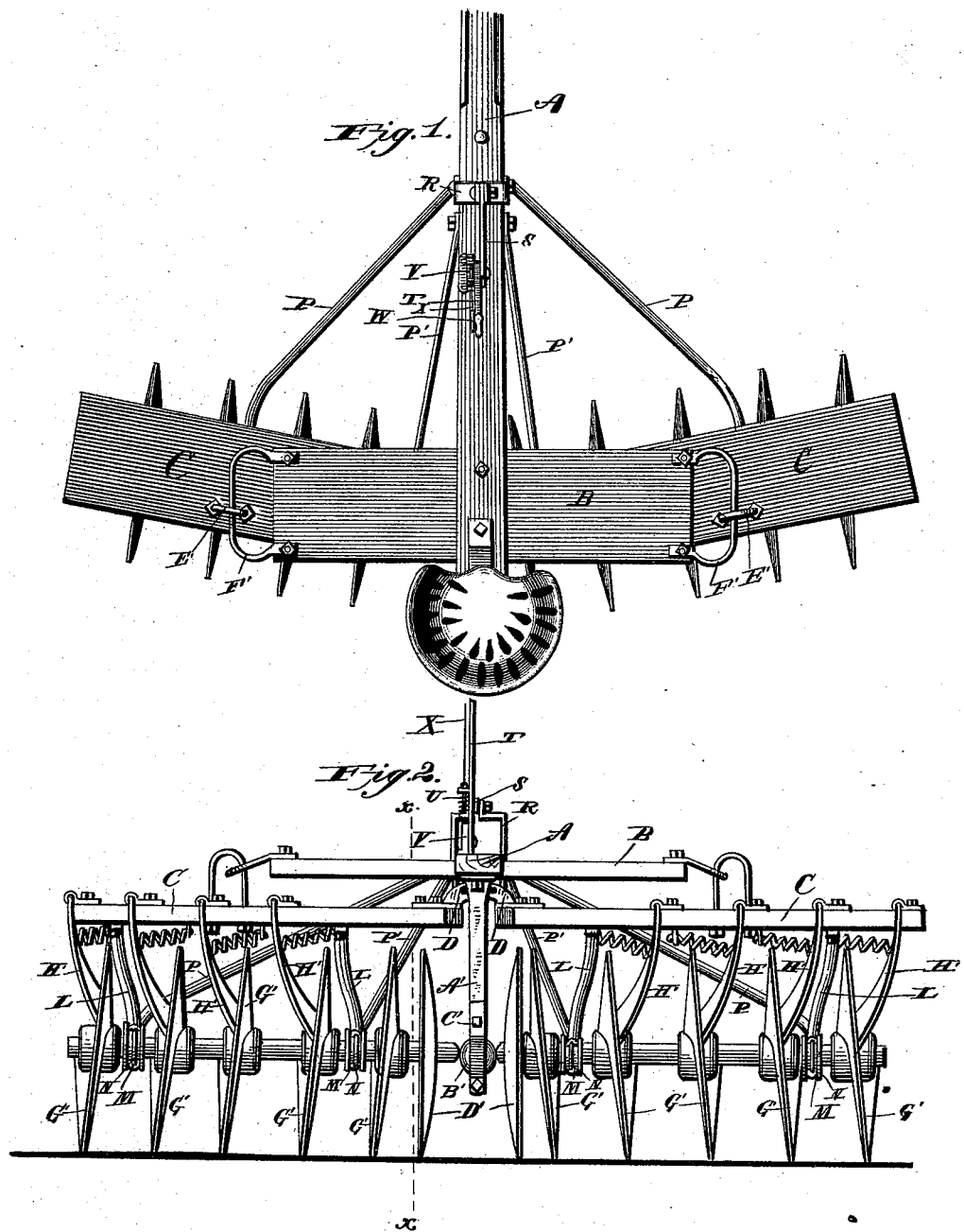

(No Model.)  2 Sheets—Sheet 2.
E. C. BOYER.
DISK HARROW AND CULTIVATOR.
No. 401,994.  Patented Apr. 23, 1889.
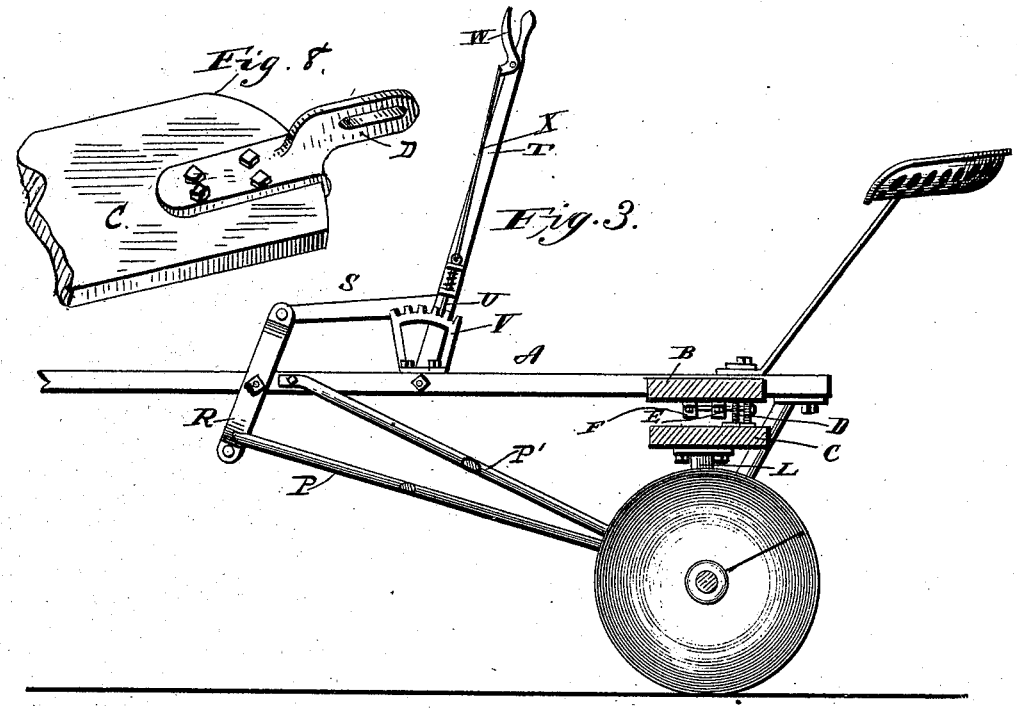
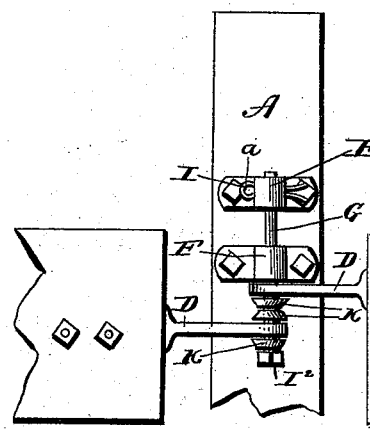
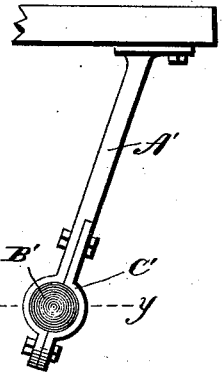
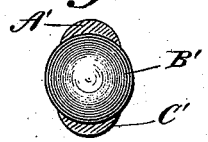
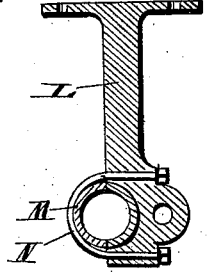
WITNESSES
INVENTOR,
E. C. Boyer
By C. M. Alexander
Attorney.

UNITED STATES PATENT OFFICE.

EDWARD C. BOYER, OF DAYTON, OHIO.

DISK HARROW AND CULTIVATOR.

SPECIFICATION forming part of Letters Patent No. 401,994, dated April 23, 1889.

Application filed December 28, 1888. Serial No. 294,880. (No model.)

*To all whom it may concern:*

Be it known that I, EDWARD C. BOYER, a citizen of the United States, residing at Dayton, in the county of Montgomery and State of Ohio, have invented certain new and useful Improvements in Disk Harrows and Cultivators, of which the following is a specification, reference being had therein to the accompanying drawings.

This invention relates to certain improvements in that class of cultivators known as "disk harrows;" and it has for its objects to provide an improved connection for securing the gang-beams to the tongue, whereby the said beams will be permitted to swing properly on said connections and to move longitudinally thereon, while at the same time they are prevented from rising or riding up vertically at the connecting-points, as more fully hereinafter explained.

My invention further has for its objects to provide for resisting the end-thrust of the adjacent ends of the gang-shafts, so as to permit the said shafts to rotate independently of each other and with the least possible friction.

My invention also has for its objects to provide for adjusting the gang shafts or axles at different angles to the tongue.

My invention still further has for its objects to provide for giving a flexible draft to the gang-shafts directly from the center thereof, so as to permit the same to vibrate freely in any direction; and my invention finally has for its objects to provide for cutting or plowing away the ridge left in the field between the adjacent gangs.

The above-mentioned objects I attain by the means illustrated in the accompanying drawings, in which—

Figure 1 represents a plan view of the improved harrow or cultivator. Fig. 2 represents a rear view thereof. Fig. 3 represents a central longitudinal sectional view of the same. Fig. 4 represents a bottom view of a portion of the tongue, showing the connections by which the gang-beams are secured to the same. Fig. 5 represents a side elevation of the rear portion of the tongue and the standard carrying a ball or sphere against which the adjacent ends of the gang shafts or axles abut. Fig. 6 represents a partial sectional view taken on the line $y\ y$ of Fig. 5. Fig. 7 represents a vertical sectional view of one of the gang-standards and the divided axle-box connected thereto; Fig. 8, a perspective view of the inner end of one of the gang-beams.

Referring to the drawings, the letter A indicates the tongue of the apparatus, having at its rear end a cross-beam, B, extending to each side.

The letters C C indicate the gang-beams, which have bolted to their adjacent ends the curved lugs D, which are slotted, as shown in Fig. 2 of the drawings, for the purpose hereinafter explained.

To the lower side of the tongue, near the rear, are bolted two hangers, E F, having bearings for a bolt, G, which is fastened in the hanger E by means of a spring, $a$, or other fastening device. To the projecting end of the bolt are secured the slotted ends of the lugs D, the bolt passing through the slots in the lugs, which are confined on the bolt by means of a nut or head, $I^2$. Between the lugs and on the outside of the outer lug are located beveled washers K, which permit the lugs and the attached beams to swing slightly, so that their angular adjustment may be readily effected, as more fully hereinafter explained.

To the lower sides of the beams C are secured the hangers or dependent standards L, which are provided with semicircular recesses at their lower ends, in which are seated the journal-boxes M of the axles or shafts. The said boxes consist of divided collars, which are provided with confining-ribs on the outside, and are held in their seats by means of clips N, passing through suitable transverse apertures in the standards or hangers, and are fastened therein by means of screw-nuts secured to their projecting ends. The lower ends of the standards are also provided with eyes or loops, to which the drag-bars P P' are attached at their rear ends. The inner drag-bars at their forward ends are pivoted to the tongue, and the forward ends of the outer drag-bars are pivoted to the lower ends of the lever R, the upper ends of which are connected by means of the link S to a hand-lever, T, fulcrumed to the tongue. The said hand-lever is provided with a latch-bolt, U, the lower end of which engages the teeth of a segment-standard, V, secured to the tongue, the bolt being operated by a small lever, W, to which it is connected by a link, X.

By means of the above-mentioned levers the outer drag-bars may be operated to set the gang-beams at any desired angle and hold them in position when so set.

To the lower side of the tongue is bolted a hanger, A', which extends down between the two gang-axles, the said hanger being provided at its lower end with a semicircular seat for a ball or sphere, B', which is confined in place by a correspondingly-shaped seat in a plate, C', which is bolted to the said hanger, as shown in Figs. 2 and 5 of the drawings. The adjacent ends of the gang axles or shafts are rounded, as shown in Fig. 2, and bear against the said ball or sphere, which is free to rotate and takes up the end-thrust of said axles or shafts with a minimum amount of friction. To the inner ends of the said axles or shafts are secured the disks or concavo-convex wheels D', which serve to plow or break up the ridge which would be otherwise left in the field by the respective gang-disks.

The gang-beams are connected to the outer ends of the cross-beam B by means of the loops E' F', and the gang-axles carry a series of spiral cultivator-disks, G', against which bear a series of spring-actuated scrapers, H'; but as these devices form part of the subject-matter of an application for Letters Patent of the United States filed by me the 5th day of March, 1888, and numbered 266,234, I do not claim such devices in the present application.

Having thus described my invention, what I claim, and desire to secure by Letters Patent, is—

1. The combination, with the tongue and gang-beams, the former being provided with a horizontal bolt or rod, of plates D, secured to the inner ends of the gang-beams and provided with horizontal slots for the passage of the said bolt, whereby the beams will have a limited vibratory movement, but will be prevented from lifting at their inner ends, substantially as set forth.

2. The combination of a tongue and gang-beams, a horizontal stationary bolt secured to the under side of the said tongue near its rear end, and lugs carried by the gang-beams at their inner ends and provided with horizontal slots for the passage of the said bolt, substantially as described.

3. The combination of a tongue, bearings secured upon the under side of the said tongue, a horizontal bolt secured removably in these bearings and provided with a head or nut, gang-beams provided with lugs at their inner ends, these lugs being provided with horizontal slots for the passage of the said horizontal bolt, and washers upon this bolt between the said lugs, substantially as described.

4. In a disk harrow, the combination of a tongue, the vibrating gang-beams loosely attached to the tongue, independent gang-shafts journaled in bearings attached to the said vibrating beams, this shaft being provided with pulverizing-disks, a hanger, A', depending from the said tongue and provided with a divided spherical socket at its lower end, and a ball loosely confined in this socket and adapted to receive the end-thrusts of the said vibrating gang-shafts, substantially as herein set forth.

5. The combination of the tongue and gang-beams, lugs or plates provided with horizontal slots, and a horizontal stationary bolt whereby the gang-beams will be allowed a limited lateral vibratory movement, but will not be permitted to rise at their inner ends, substantially as described.

6. The combination, with the drag axles or shafts provided with a series of spiral cutters or disks, of the concavo-convex disks or wheels secured to their adjacent ends, substantially as and for the purposes set forth.

In testimony whereof I affix my signature in presence of two witnesses.

EDWARD C. BOYER.

Witnesses:
BERT JOHNSON,
HARRY H. PRUGH.